US010289368B2

(12) United States Patent
Asai

(10) Patent No.: US 10,289,368 B2
(45) Date of Patent: May 14, 2019

(54) NON-TRANSITORY COMPUTER-READABLE STORAGE MEDIUM STORING COMPUTER-READABLE INSTRUCTIONS FOR CAUSING INFORMATION PROCESSING DEVICE TO SELECT COMMUNICATION DESTINATION DEVICE, WITH WHICH INFORMATION PROCESSING DEVICE COMMUNICATES

(71) Applicant: Brother Kogyo Kabushiki Kaisha, Nagoya-shi, Aichi-ken (JP)

(72) Inventor: Norihiko Asai, Tajimi (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 14/632,538

(22) Filed: Feb. 26, 2015

(65) Prior Publication Data
US 2015/0169263 A1 Jun. 18, 2015

Related U.S. Application Data

(63) Continuation-in-part of application No. 14/303,065, filed on Jun. 12, 2014.

(30) Foreign Application Priority Data

Jun. 18, 2013 (JP) .................................. 2013-127802
Feb. 26, 2014 (JP) .................................. 2014-034818

(51) Int. Cl.
*G06F 3/12* (2006.01)

(52) U.S. Cl.
CPC ............ *G06F 3/126* (2013.01); *G06F 3/1204* (2013.01); *G06F 3/1205* (2013.01);
(Continued)

(58) Field of Classification Search
None
See application file for complete search history.

(56) References Cited

U.S. PATENT DOCUMENTS 7,804,608 B2 9/2010 Shirai et al.
2002/0001100 A1* 1/2002 Kawanabe ............. G06K 15/00
358/1.15
(Continued)

FOREIGN PATENT DOCUMENTS

JP 2005-044080 A 2/2005
JP 2005-149094 6/2005
(Continued)

OTHER PUBLICATIONS

Nov. 10, 2016—(US) Non-Final Office Action—U.S. Appl. No. 14/303,065.
(Continued)

*Primary Examiner* — Marivelissa Santiago Cordero
*Assistant Examiner* — Pawandeep Dhingra
(74) *Attorney, Agent, or Firm* — Banner & Witcoff, Ltd.

(57) ABSTRACT

An information processing device may be configured to communicate with a communication destination device selected as a communication target among a plurality of devices. The information processing device may store, in a storage unit, communication destination device identifying information for identifying a device that was selected as the communication destination device and first network identifying information for identifying a network to which the communication destination device belongs. The information processing device may receive second network identifying information for identifying a network to which the information processing device is to connect. The information processing device may display a first image in a case that the received second network identifying information does not match the first network identifying information. The infor-
(Continued)

mation processing device may display a second image different from the first image in a case that the received second network identifying information matches the first network identifying information.

14 Claims, 13 Drawing Sheets

(52) U.S. Cl.
CPC .......... *G06F 3/1236* (2013.01); *G06F 3/1257* (2013.01); *G06F 3/1286* (2013.01); *Y02D 10/1592* (2018.01)

(56) References Cited

U.S. PATENT DOCUMENTS

| | | | |
|---|---|---|---|
| 2003/0103081 A1 | 6/2003 | Ebuchi | |
| 2005/0018236 A1* | 1/2005 | Shirai | G06F 3/1204 358/1.14 |
| 2005/0105130 A1* | 5/2005 | Hagiuda | H04L 67/16 358/1.15 |
| 2006/0200564 A1* | 9/2006 | Watanabe | G06F 3/1212 709/227 |
| 2006/0203282 A1* | 9/2006 | Iwai | G06F 3/1207 358/1.15 |
| 2006/0221863 A1* | 10/2006 | Ishimoto | G06F 3/1206 370/254 |
| 2007/0047524 A1 | 3/2007 | Moriya | |
| 2007/0067734 A1 | 3/2007 | Cunningham et al. | |
| 2008/0218816 A1* | 9/2008 | Sakuramata | H04N 1/00411 358/537 |
| 2010/0100855 A1* | 4/2010 | Yoo | G06F 3/0486 715/863 |
| 2010/0177019 A1 | 7/2010 | Jeong et al. | |
| 2010/0309515 A1 | 12/2010 | Odagawa | |
| 2011/0143789 A1 | 6/2011 | Watanabe et al. | |
| 2012/0206498 A1 | 8/2012 | Kai et al. | |
| 2012/0262747 A1* | 10/2012 | Saito | H04N 1/00411 358/1.13 |
| 2012/0270587 A1 | 10/2012 | Watanabe et al. | |
| 2013/0063771 A1* | 3/2013 | Song | H04N 1/32128 358/1.15 |
| 2013/0169987 A1 | 7/2013 | Akiyama | |
| 2015/0365919 A1 | 12/2015 | Watanabe et al. | |

FOREIGN PATENT DOCUMENTS

| | | | |
|---|---|---|---|
| JP | 2011-147136 A | 7/2011 | |
| JP | 2013-070144 A | 4/2013 | |
| JP | 2013-097769 | * 5/2013 | ............... G06F 3/12 |

OTHER PUBLICATIONS

Feb. 7, 2017—(JP) Notification of Reasons for Rejection—App 2014-034818, Eng Tran.
Jun. 16, 2017—U.S. Final Office Action—U.S. Appl. No. 14/303,065.
Jan. 30, 2018—(JP) Notification of Reasons for Revocation—JP Patent Opposition No. 2017-701134 (Patent No. 6136619), Eng Tran.
Concise Explanation (English) of Japanese Written Opposition dated Nov. 1, 2018 for JP Patent Opposition No. 2017-701134 (Patent No. 6136619 B2, dated May 31, 2017 (App. No. 2013-127802, filed Jun. 18, 2013)).
Apr. 11, 2018—U.S. Non-final Office Action—U.S. Appl. No. 14/303,065.
Mar. 7, 2019—U.S. Final Office Action—U.S. Appl. No. 14/303,065.

* cited by examiner

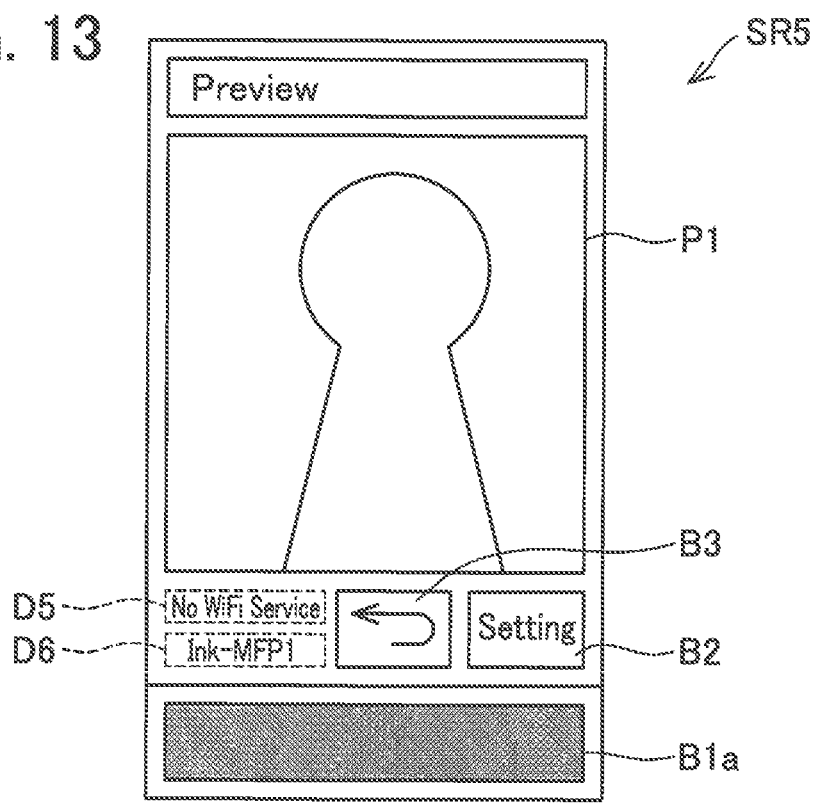

FIG. 14

| | Model Number | IP Address | SSID | Default Device Flag | Connection Confirmation Result | Received Model Number | Status |
|---|---|---|---|---|---|---|---|
| Photo Printing | Ink-MFP1 | 192.168.100.101 | SSID-1 | ON | OK | Ink-MFP1 | Power On, No Error |
| | Ink-MFP2 | 192.168.100.102 | SSID-1 | — | — | — | — |
| | Ink-MFP3 | 211.9.36.154 | SSID-2 | — | — | — | — |
| | — | — | — | — | — | — | — |
| Web Printing | Ink-MFP1 | 192.168.100.101 | SSID-1 | — | OK | Ink-MFP1 | Power On, No Error |
| | Ink-MFP2 | 192.168.100.102 | SSID-1 | — | — | — | — |
| | Ink-MFP3 | 211.9.36.154 | SSID-2 | — | — | — | — |
| | Laser1 | 211.9.36.155 | SSID-2 | ON | — | — | — |
| Scanning | Ink-MFP1 | 192.168.100.101 | SSID-1 | — | OK | Ink-MFP1 | Power On, No Error |
| | Ink-MFP2 | 192.168.100.102 | SSID-1 | — | — | — | — |
| | Scan1 | 192.168.100.103 | SSID-1 | ON | — | — | — |
| | Ink-MFP3 | 211.9.36.154 | SSID-2 | — | — | — | — |

| | Model Number | MAC Address | Default Device Flag | Connection Confirmation Result | Received Model Number | Status |
|---|---|---|---|---|---|---|
| Photo Printing | Ink-MFP4 | MAC Address-1 | ON | OK | Ink-MFP4 | Power On, No Error |
| | Ink-MFP5 | MAC Address-2 | — | — | — | — |
| Web Printing | Ink-MFP4 | MAC Address-1 | — | OK | Ink-MFP4 | Power On, No Error |
| | Ink-MFP5 | MAC Address-2 | — | — | — | — |
| | Laser2 | MAC Address-4 | ON | — | — | — |
| | Ink-MFP4 | MAC Address-1 | — | OK | Ink-MFP4 | Power On, No Error |
| | Ink-MFP5 | MAC Address-2 | — | — | — | — |
| Scan | Scan3 | MAC Address-5 | ON | — | — | — |

NON-TRANSITORY COMPUTER-READABLE STORAGE MEDIUM STORING COMPUTER-READABLE INSTRUCTIONS FOR CAUSING INFORMATION PROCESSING DEVICE TO SELECT COMMUNICATION DESTINATION DEVICE, WITH WHICH INFORMATION PROCESSING DEVICE COMMUNICATES

CROSS-REFERENCE TO RELATED APPLICATIONS

This application claims priority to Japanese Patent Application No. 2014-034818, filed on Feb. 26, 2014, the contents of which are hereby incorporated by reference into the present application.

TECHNICAL FIELD

This application relates to a non-transitory computer-readable storage medium storing instructions for an information processing device, an information processing device and a method of controlling an information processing device capable of setting devices to execute various types of processing.

DESCRIPTION OF RELATED ART

Conventionally, in a computer such as a PC, a printing environment of selecting the user's intended printer among a plurality of printers connected in a network environment and sending printing instructions to the selected printer is now in widespread use. In order to perform printing with the intended printer, the user installs a driver corresponding to that printer type. When a driver is installed, the IP address of the printer that is used via the driver is stored in the PC. Moreover, known is a technology for the user to register the most often-used printer as the default printer in the PC. Normally, the user inputs, through the PC, printing instructions to the printer that is registered as the default printer.

SUMMARY

A technology is known that performs data communication between a portable terminal and a device such as a printer. Moreover, a technology is known for the user to register a device, which is often used for communication, as the default device in the portable terminal. Nevertheless, since a portable terminal is movable, there are cases that it is not possible to communicate with the default device. In the foregoing case, there are cases that the user-friendliness is impaired if information related to the default device is not displayed appropriately.

In one aspect of the teachings disclosed herein, a non-transitory computer-readable storage medium storing computer-readable instructions for an information processing device may be provided. The information processing device may be configured to communicate with a communication destination device which is selected as a communication target among a plurality of devices. The information processing device may comprise: a communication interface configured to communicate with the plurality of devices; a processor coupled to the communication interface; and a storage unit. The instructions, when executed by the processor, may cause the information processing device to perform storing, in the storage unit, communication destination device identifying information for identifying a device that was selected as the communication destination device among the plurality of devices. The instructions may cause the information processing device to perform storing, in the storage unit, first network identifying information for identifying a network to which the communication destination device is belonging. The instructions may cause the information processing device to perform receiving second network identifying information for identifying a network to which the information processing device is to connect. The instructions may cause the information processing device to perform displaying a first image indicating that communication cannot be performed with the communication destination device on a display of the information processing device, in a case that a state of the information processing device is in an unmatched state, where the received second network identifying information does not match the first network identifying information. The instructions may cause the information processing device to perform displaying a second image different from the first image, and indicating which of the plurality of devices is the communication destination device on the display, in a case that the state of the information processing device is in a matched state, where the received second network identifying information matches the first network identifying information.

BRIEF DESCRIPTION OF DRAWINGS

FIG. 13 shows an example of a fifth preview screen;
FIG. 14 shows an example of a table;
and
FIG. 15 shows an example of a table.

EMBODIMENT

Embodiment 1 <Configuration of Network 10>

Figure 1:
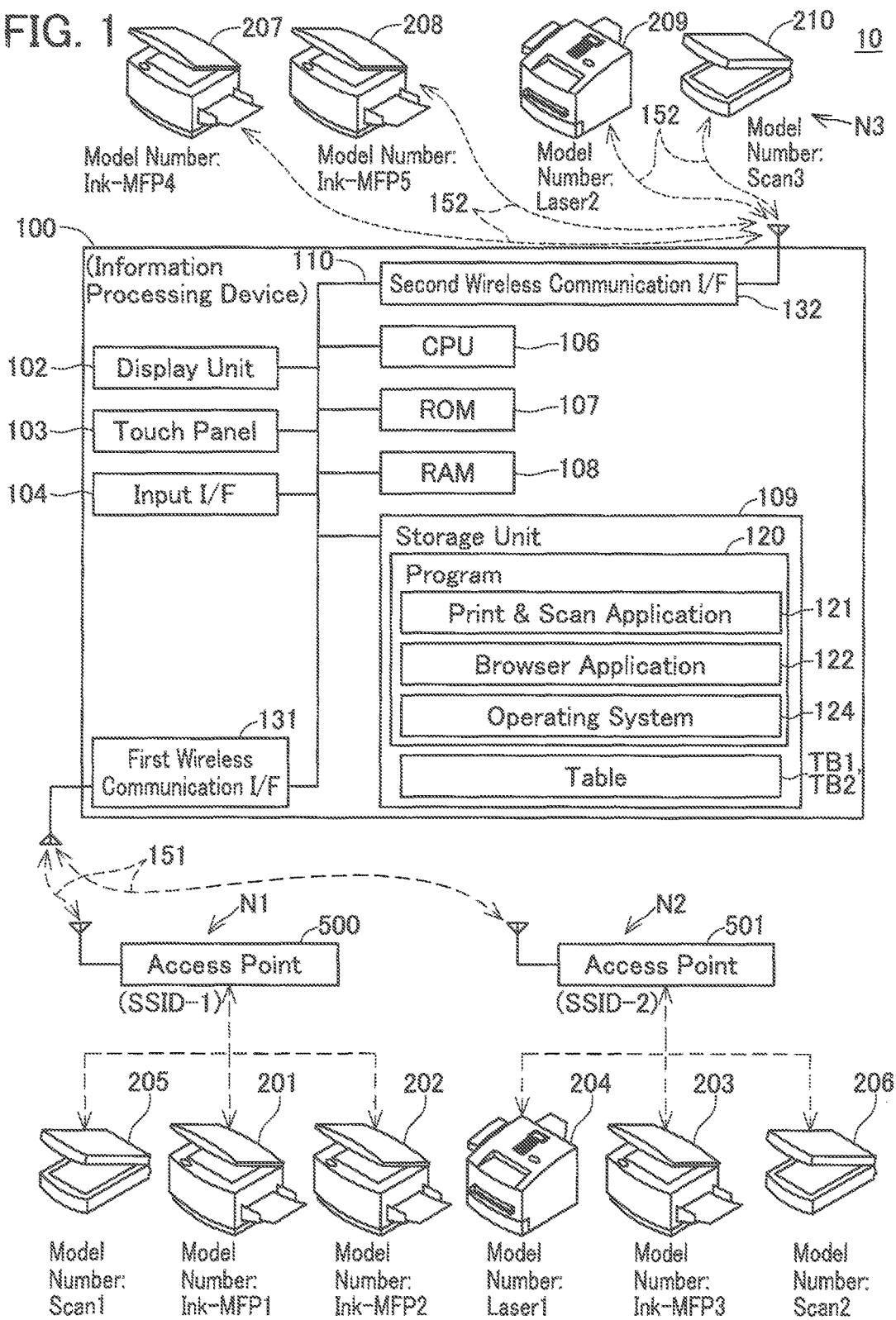
FIG. 1 shows the configuration of a network.

FIG. 1 is a block diagram showing the configuration of a network 10. The network 10 comprises an information processing device 100, inkjet MFPs 201 to 203 and 207 and 208, color laser printers 204 and 209, scanners 205, 206 and 210, and access points 500 and 501. The information processing device 100 communicates with the access point 500 or 501 based on a first wireless communication 151 via a first wireless communication I/F 131. As an example of the first wireless communication 151, there is Wi-Fi (registered trademark of Wi-Fi Alliance) as one type of wireless LAN. The first wireless communication I/F 131 can be validated or invalidated by the operating system 124. When the first wireless communication I/F 131 is set to be invalidated, the information processing device 100 is unable to execute the first wireless communication 151.

A network N1 is formed based on the access point 500. Connected to the access point 500 are the inkjet MFPs 201 and 202, and the scanner 205. A network N2 is formed based on the access point 501. Connected to the access point 501 are the inkjet MFP 203, the color laser printer 204, and the scanner 206. The inkjet MFP is a multifunction peripheral comprising a printing function, a scanning function, and a copying function. The inkjet MFP is a device that is suitable for the purposes of photo printing 611, web printing 612, and scanning 613. The color laser printer is a device that is suitable for the purpose of web printing 612. The scanner is a device that is suitable for the purpose of scanning 613.

Moreover, the information processing device 100 communicates with each of the inkjet MFPs 207 and 208, the color laser printer 209, and the scanner 210 based on a second wireless communication 152 via a second wireless communication I/F 132. The second wireless communication 152 is a communication capable of directly communicating with the communication-target device without going through an access point. A network N3 is formed based on the second wireless communication 152. As an example of the second wireless communication 152, there is Bluetooth (registered trademark of Bluetooth SIG, Inc.).

The information processing device 100 can execute a print & scan application 121, and send a print request or a scan request to the inkjet MFPs 201 to 203, 207 and 208, the color laser printers 204 and 209, and the scanners 205, 206 and 210 via a first wireless communication 151 or a second wireless communication 152.

The access points 500 and 501 have service set identifiers (referred to as SSIDs). An SSID is a name for identifying each of the access points 500 and 501. In the example of the first embodiment, the SSID of the access point 500 is "SSID-1", and the SSID of the access point 501 is "SSID-2".

<Configuration of Information Processing Device 100>

The information processing device 100 is, for example, a portable device such as a portable phone or a portable terminal device. The information processing device 100 comprises a display unit 102, a touch panel 103, an input I/F 104, a first wireless communication I/F 131, a second wireless communication I/F 132, a CPU 106, a RAM 108, a storage unit 109 and the like, and these components are connected to each other via an I/O port 110.

The display unit 102 receives an image signal that is output from the CPU 106, and displays an image based on the received image signal. As the display unit 102, used may be, for example, an LCD or an organic EL panel. The touch panel 103 is formed from a transparent member, and disposed so as to cover the surface of the display unit 102. The touch panel 103 detects the position that was touched with the user's finger or the like, and outputs the detected position information to the CPU 106. In the ensuing explanation, the reception of the position information, which was output from the touch panel 103, by the CPU 106 is referred to as the CPU 106 accepting the touch or other similar expressions. The input I/F 104 is, for example, an operation button.

The CPU 106 executes the programs stored in the storage unit 109. The RAM 108 temporarily stores information that is required for the processing to be performed by the CPU 106. The storage unit 109 may also be a computer-readable storage medium. A computer-readable storage medium is, for example, a non-transitory medium such as a ROM, a RAM, a flash memory, and a hard disk. Electric signals that deliver programs that are downloaded from an online server or the like do not correspond to a non-transitory medium.

The storage unit 109 may also be configured by combining a flash memory, a hard disk (referred to as HDD), and a buffer provided in the CPU 106. The storage unit 109 can store image data, document data and the like. The storage unit 109 additionally stores information such as a processing execution reservation flag, a communication path flag, and executed purpose information, which are described later.

The storage unit 109 stores a program 120. The program 120 includes a print & scan application 121, a browser application 122, an operating system 124, and the like. The CPU 106 executes processing according to the program 120 stored in the storage unit 109. In the ensuing explanation, the CPU 106 to execute programs such as the print & scan application 121 and the operating system 124 is sometimes simply referred to by the program name. For example, the indication of "print & scan application 121" may mean "the CPU 106 that executes the print & scan application 121". The print & scan application 121 is an application for causing the CPU 106 to execute processing for causing the inkjet MFP and the like to perform print processing or scan processing. The browser application 122 is an application for displaying web data on the display unit 102. The operating system 124 is a program for providing the basic functions that are commonly used by the print & scan application 121 and the like. The operating system 124 includes a program for causing the first wireless communication I/F 131 to execute the first wireless communication 151, and a program for causing the second wireless communication I/F 132 to execute the second wireless communication 152.

Moreover, the storage unit 109 stores tables TB1 and TB2. The table TB1 is a table for storing the default device when the first wireless communication 151 is used. Moreover, the table TB2 is a table for storing the default device when the second wireless communication 152 is used. The default device is a device that is selected in advance as the device to execute printing among a plurality of devices.

FIG. 14 shows an example of the table TB1. The table TB1 comprises storage areas for each of the three types of purposes of photo printing 611, web printing 612, and scanning 613. The storage area for the purpose of photo printing 611 stores information regarding the devices that are suitable for photo printing. In photo printing, the information processing device 100 sends a print request of image data based on JPEG, Bitmap, GIF or the like to a device equipped with a printing function, and cause the device to execute printing (hereinafter referred to as the "photo print processing") is performed. The storage area for the purpose of web printing 612 stores information regarding the devices that are suitable for web printing. In web printing, the information processing device 100 sends a print request of a web page to a device equipped with a printing function, and cause the device to execute printing (hereinafter referred to as the "web print processing") is performed. The storage area for the purpose of scanning 613 stores information regarding the devices that are suitable for scanning. In scanning, the information processing device 100 sends a scan request to a device equipped with a scanning function, and cause the device to execute scanning (hereinafter referred to as the "scan processing") is performed. Note that the photo print processing and the web print processing are sometimes collectively referred to as "print processing".

The table TB1 stores, as information related to the devices, identifying information 600, a default device flag 605, a connection confirmation result 606, a received model number 607, and a status 608. The identifying information 600 is information for identifying the device, and comprises a model number 601, an IP address 602, and an SSID 603. The identifying information 600 is stored in correspondence with the respective purposes of photo printing 611, web printing 612, and scanning 613. The model number 601 is information for identifying the type of each device. In the first embodiment, the model number 601 of the respective devices of the inkjet MFPs 201 to 203 is "Ink-MFP1", "Ink-MFP2", and "Ink-MFP3". The model number 601 of the device of the color laser printer 204 is "Laser1". The model number 601 of the respective devices of the scanners 205 and 206 is "Scan1" and "Scan2". The IP address 602 is an identification number that is assigned to the respective devices and used in the communication. The SSID 603 is information for identifying the access point of the communication destination.

The default device flag 605 is information indicating the default device. The default device is one device that is set for each purpose. The default device is a device that is preferentially used among a plurality of devices when there is a plurality of devices capable of executing processing related to a certain purpose. The table TB1 is edited in a connection confirmation thread described later (for example, S168, S171), or when print processing or scan processing is executed (S580).

The connection confirmation result 606 is information indicating a result of the connection confirmation thread described later. A device in which the connection confirmation result 606 is "OK" is a device which has been confirmed as being connectable. A device in which the connection confirmation result 606 is "NG" is a device which has been confirmed as being non-connectable. The received model number 607 is a model number of the device of the communication destination that was received from the device of the connection destination based on the connection confirmation thread. The status 608 is information indicating the device status of the device of the communication destination that was received from the device of the connection destination based on the connection confirmation thread. As examples of the device status, there are a power ON status, and an error status.

The table TB1 stores information related to the device that executed processing as described later in S580. It is thereby possible to store, in the table TB1, one or more SSIDs for identifying previously connected networks. In other words, the table TB1 also functions as a table for storing the log of devices that were previously caused to execute processing. Moreover, in the example of the table TB1, up to four logs of devices that were previously caused to execute processing can be stored in the respective purposes of photo printing 611, web printing 612, and scanning 613.

FIG. 15 shows an example of the table TB2. The table TB2 stores, as information related to the devices, identifying information 700 and a default device flag 605. The identifying information 700 comprises a model number 601 and a MAC address 604. The MAC address 604 is a physical address that is unique to the respective devices. The MAC address 604 is information that is used when the second wireless communication 152 is executed. The table TB2 is also edited in the connection confirmation thread described later, or when print processing or scan processing is executed. Note that, in the table TB2, since the contents of information given the same reference numeral as the information of the table TB1 have been previously explained during the explanation of the table TB1, the explanation of redundant information is omitted.

Some features relating to the description in the present specification are hereby explained. In the present specification, the description "the CPU 106 of the information processing device 100 receives various types of information" includes the technical meaning "the CPU 106 of the information processing device 100 acquires various types of information via the first wireless communication I/F 131 or the second wireless communication I/F 132". Further, the description "the CPU 106 of the information processing device 100 sends various types of information" includes the technical meaning "the CPU 106 of the information processing device 100 outputs various types of information via the first wireless communication I/F 131 or the second wireless communication I/F 132".

Here, a definition of the words "data" and "information" will be explained. In the present specification, "information" is used as a concept superordinate to "data". Consequently, "A data" may be rephrased as "A information". Further, "B data", which is duplicated or converted from "A data", is "A information" as long as it is used having a meaning equal to the "A data".

<Operation of Print & Scan Application 121>

Figure 2:
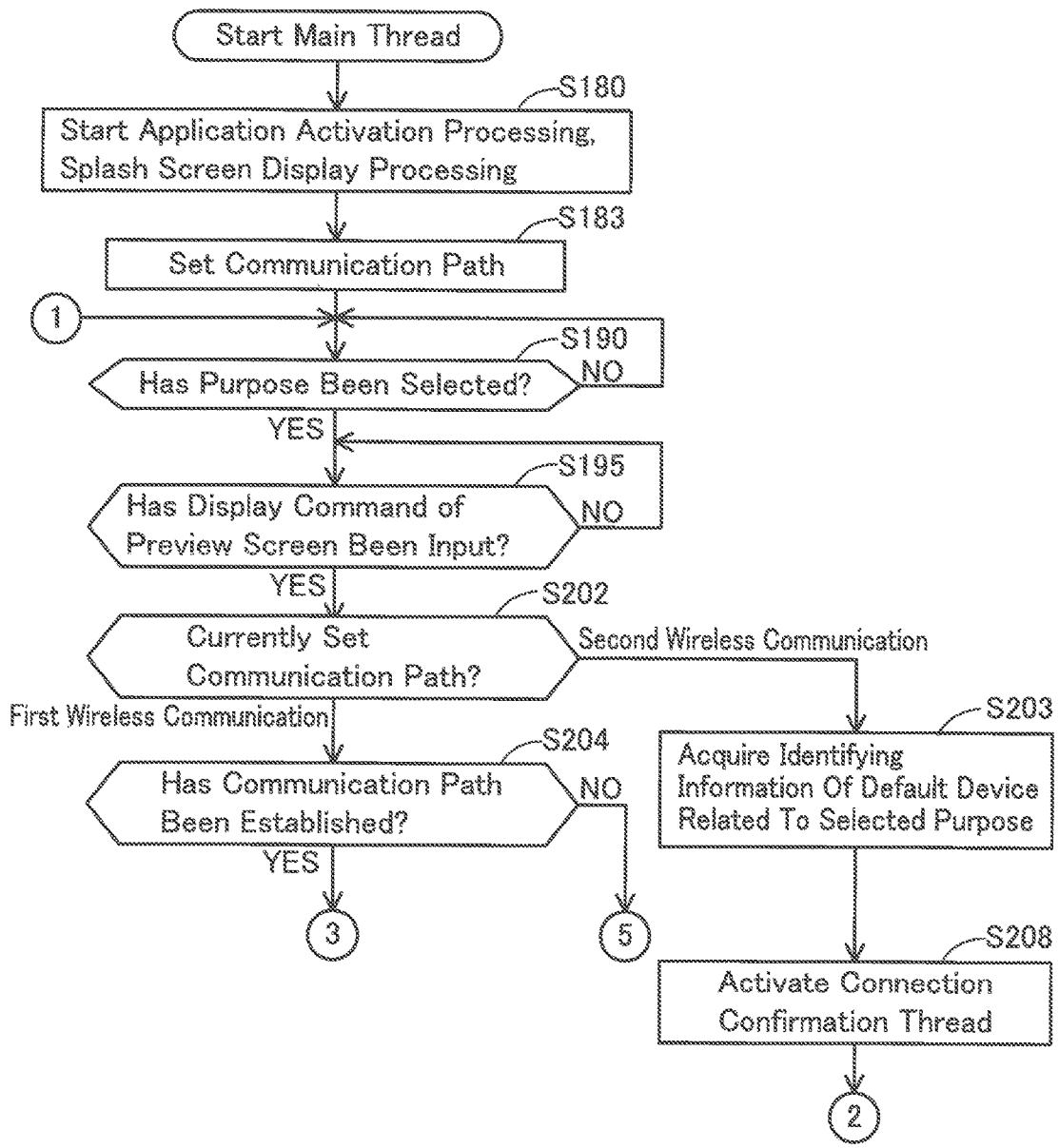
FIG. 2 is a flowchart for explaining an operation example of the main thread.

The processing performed by the CPU 106 to control the respective components according to the print & scan application 121 is now explained. When the print & scan application 121 is activated, a main thread shown in FIG. 2 is started.

In S180, the CPU 106 starts activation processing of the print & scan application 121. Moreover, the CPU 106 starts splash screen display processing. A splash screen is a screen showing that the print & scan application 121 is being activated.

In S183, the CPU 106 sets a communication path, which was last used in the previous communication, as the communication path to be used this time. Specifically, the CPU 106 sets either the first wireless communication 151 or the second wireless communication 152 as the communication path to be used this time according to the communication path flag stored in the storage unit 109.

In S190, the CPU 106 determines whether the purpose has been selected by the user. For example, a button for selecting the respective purposes of photo printing 611, web printing 612, and scanning 613 may be displayed on the display unit 102 to accept touch inputs. When any one of the buttons is touched, it may be determined that the purpose corresponding to the touched button has been selected. When a negative determination is obtained in S190 (S190: NO), the CPU 106 returns to S190, and when a positive determination is obtained (S190: YES), the CPU 106 proceeds to S195.

In S195, the CPU 106 determines whether a preview screen display command has been input by the user. This determination may be made by displaying a button image for accepting the input of the preview screen display command on the display unit 102, and determining whether the button has been touched. When the selected purpose is photo printing 611, the button image for selecting the photo data to be printed among a plurality of photo data may concurrently serve as the button image for accepting the input of the preview screen display command. When the selected purpose is web printing 612, a configuration may be adopted where a button image for accepting the input of the preview screen display command is also displayed on the screen displaying the web page. The web page that is being displayed when the input of the preview screen display command was input may also be used as the web page to be printed. Moreover, the button image for accepting the selection of scanning 613 may concurrently serve as the button for accepting the input of the preview screen display command. When the selected purpose is photo printing 611 or web printing 612, the preview screen is a screen including a print preview image. Moreover, when the selected purpose is scanning 613, the preview screen is a screen including a scan preview image. When a negative determination is obtained in S195 (S195: NO), the CPU 106 returns to S195, and when a positive determination is obtained (S195: YES), the CPU 106 proceeds to S202.

In S202, the CPU 106 determines the type of communication path that is currently being set as the communication path to be used. This determination may also be made based on the communication path flag that is stored in the storage unit 109. When it is determined that the second wireless communication 152 is currently being set as the communication path to be used (S202: second wireless communication), the CPU 106 proceeds to S203. In S203, the CPU 106 acquires the identifying information 700 of the default device associated with the purpose selected in S190.

Figure 6:
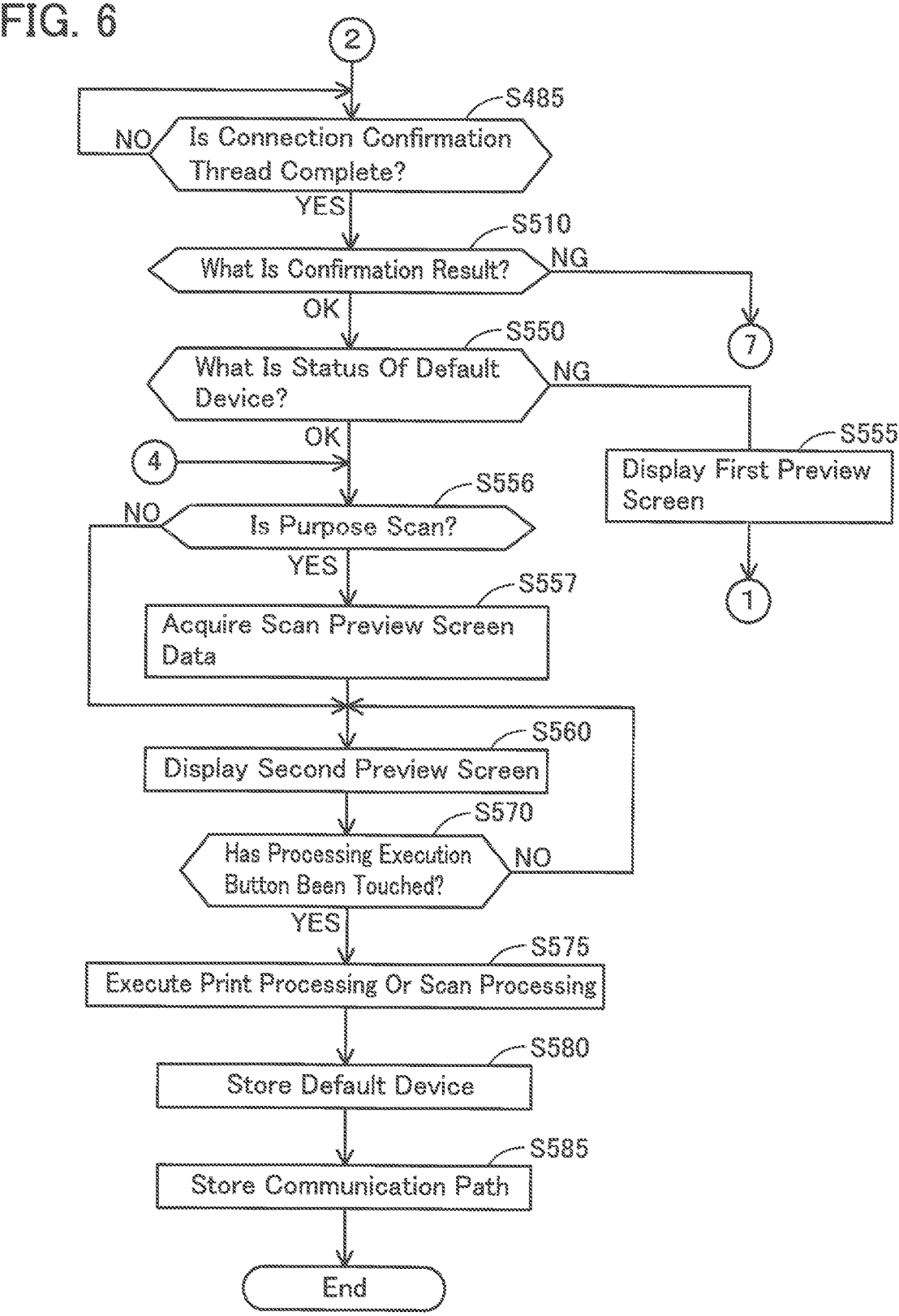
FIG. 6 is a flowchart for explaining an operation example of the main thread.

In S208, the CPU 106 activates the connection confirmation thread. The connection confirmation thread is processing for confirming whether communication with the default device is possible. An operation example of the connection confirmation thread will be described later. The CPU 106 thereafter proceeds to S485 of FIG. 6.

Meanwhile, in S202, when it is determined that the first wireless communication 151 is currently being set as the communication path to be used (S202: first wireless communication), the CPU 106 proceeds to S204. In S204, the CPU 106 determines whether a communication path using the first wireless communication 151 has actually been established. This determination may also be made by making an inquiry to the operating system 124 regarding whether the first wireless communication 151 has been established. Whether the first wireless communication 151 has been established may also be determined based on whether the status information of the operating system 124 is indicating the establishment of connection with the access point. When a positive determination is obtained (S204: YES), the CPU 106 proceeds to S205.

In S205, the CPU 106 acquires the second SSID, which is an SSID for identifying the network that is currently connected based on the first wireless communication 151. Specifically, the CPU 106 acquires the SSID of the access point; specifically, either the access point 500 or the access point 501, to which the information processing device 100 is currently connected. The information processing device 100 is connected to one access point among a plurality of access points within the communication zone based on the operation of the operating system 124. The print & scan application 121 requests the operating system 124 to output the SSID for identifying the currently connected access point, and acquires the SSID that was output pursuant to the request as the second SSID. Subsequently, the CPU 106 broadcasts a packet for requesting the device that is connected to a communicable access point to return the identifying information (for example, model number) of the device, and receives the returned identifying information.

In S210, the CPU 106 determines whether a default device of the purpose selected in S190 exists within the communication zone of the information processing device 100. Specifically, the default device of the purpose selected in S190 is identified using the table TB1. Subsequently, the CPU 106 uses the table TB1 and identifies the first SSID, which is an SSID for identifying the network belonging to the identified default device. Furthermore, the CPU 106 determines whether the identified first SSID and the second SSID acquired in S205 coincide.

A specific example of the processing of S210 is now explained. When the purpose of photo printing 611 is selected in S190, the device in which the model number 601 is "Ink-MFP 1" is identified as the default device based on the table TB1 of FIG. 14. Moreover, "SSID-1" is identified as the first SSID indicating the network to which the default device having the model number 601 of "Ink-MFP 1" belongs. Subsequently, the identified "SSID-1" is compared with the second SSID acquired in S205.

When the first SSID and the second SSID coincide, it is determined that a default device of the selected purpose exists within the communication zone of the information processing device 100 (S210: YES), and the CPU 106 proceeds to S255.

Figure 10:
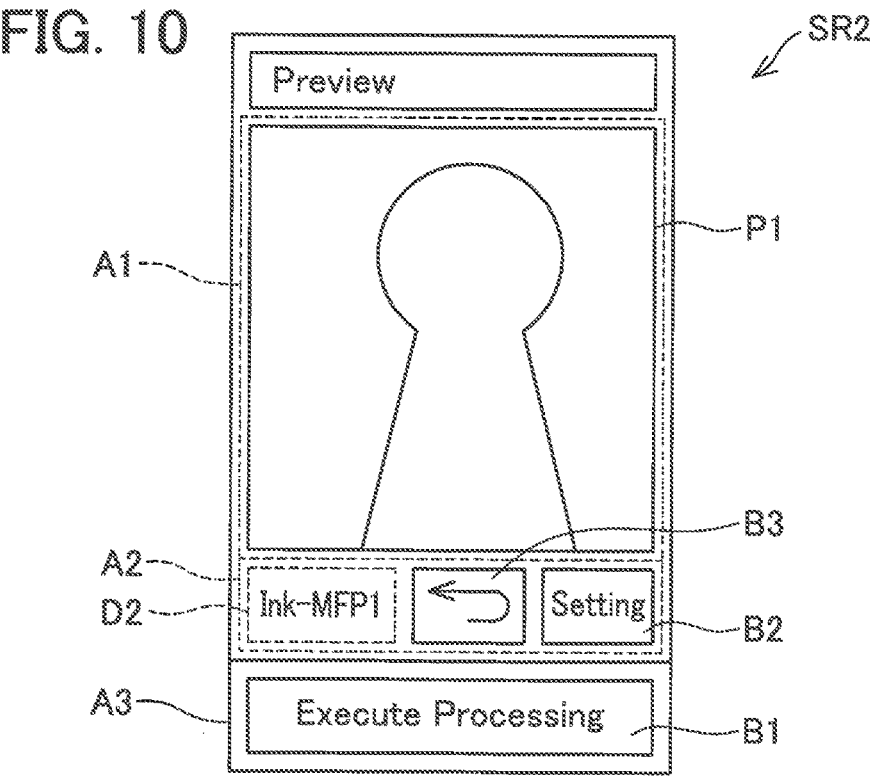
FIG. 10 shows an example of a second preview screen.

In S255, the CPU 106 displays a second preview screen. The second preview screen is a screen that is displayed when it is possible to receive a processing execution instruction. FIG. 10 shows an example of a second preview screen SR2. The second preview screen SR2 includes a preview image P1, a processing execution button B1, a setting button B2, a back button B3, and default device information D2. The second preview screen SR2 includes a main region A1, and sub regions A2 and A3. The main region A1 is a region including the center part of the display unit 102, and a region for displaying the main image. The sub regions A2 and A3 are regions that are aligned in the main region A1, and regions having a size that is smaller than the main region A1. Displayed in the main region A1 is the preview image P1 as an example of the main image. Displayed in the sub region A2 are the setting button B2, the back button B3, and the default device information D2. Displayed in the sub region A3 is the processing execution button B1.

The preview image P1 is an image indicating the print preview or the scan preview. When the selected purpose is photo printing 611 or web printing 612, the preview image P1 is an image that indicates the print mode of causing the default device to perform print processing for photo data to be printed or web data to be printed. Meanwhile, when the selected purpose is scanning 613, the preview image P1 is blank. This is because, in print processing, since the image data is stored in the information processing device 100, a preview image can be generated prior to starting the communication with the default device, but in scan processing, since the image data is generated by the default device, a preview image cannot be generated prior to starting the communication with the default device.

The processing execution button B1 is a button for accepting the input of the print execution command or the scan execution command. The setting button B2 is a button for displaying the setting screen. The setting screen is a screen for accepting inputs or changes of various settings related to printing or scanning. The back button B3 is a button for accepting the processing of returning the display screen to the immediately preceding screen. The back button B3 may also be a physical key equipped in the input I/F 104. The default device information D2 is information (for example, model number) for identifying the default device, which is the device of the communication destination.

In S260, the CPU 106 activates the connection confirmation thread. An operation example of the connection confirmation thread will be described later. The CPU 106 thereafter proceeds to S485 of FIG. 6.

Meanwhile, when the first SSID and the second SSID do not coincide (S210: NO), it is determined that the default device of the selected purpose is outside the communication zone of the information processing device 100, and the CPU 106 proceeds to S215.

In S215, the CPU 106 determines whether a default device of a purpose other than the purpose selected in S190 belongs to the network to which the information processing device 100 is currently connected. Specifically, a default device of a purpose other than the purpose selected in S190 is identified by using the table TB1. Subsequently, the first SSID for identifying the network to which the identified default device belongs is identified using the table TB1. Furthermore, whether the identified first SSID and the second SSID acquired in S205 coincide is determined.

A specific example of the processing of S210 is now explained. For example, when the purpose of photo printing 611 is selected in S190, the default device of web printing 612 as another purpose (that is, device in which the model number 601 is "Ink-MFP 3") is identified. Moreover, "SSID-2" is identified as the first SSID indicating the network to which the default device having the model number 601 of "Ink-MFP 3" belongs. Furthermore, the identified "SSID-2" is compared with the second SSID acquired in S205.

When the first SSID and the second SSID coincide, it is determined that the default device of another purpose belongs to the network to which the information processing device 100 is currently connected (S215: YES), and the CPU 106 proceeds to S220. In S220, the CPU 106 switches the communication destination to the default device of the other purpose. In S255, the CPU 106 displays the second preview screen. Since the second preview screen has been previously explained with reference to FIG. 10, the explanation thereof is omitted. The CPU 106 thereafter proceeds to S260.

Meanwhile, in S215, when it is determined that the default device of another purpose does not belong to the network to which the information processing device 100 is currently connected (S215: NO), the CPU 106 proceeds to S225 of FIG. 5. In S225, the CPU 106 determines whether another SSID that is different from the second SSID acquired in S205 is stored in the table TB1. When a negative determination is obtained (S225: NO), the CPU 106 proceeds to S230.

Figure 9:
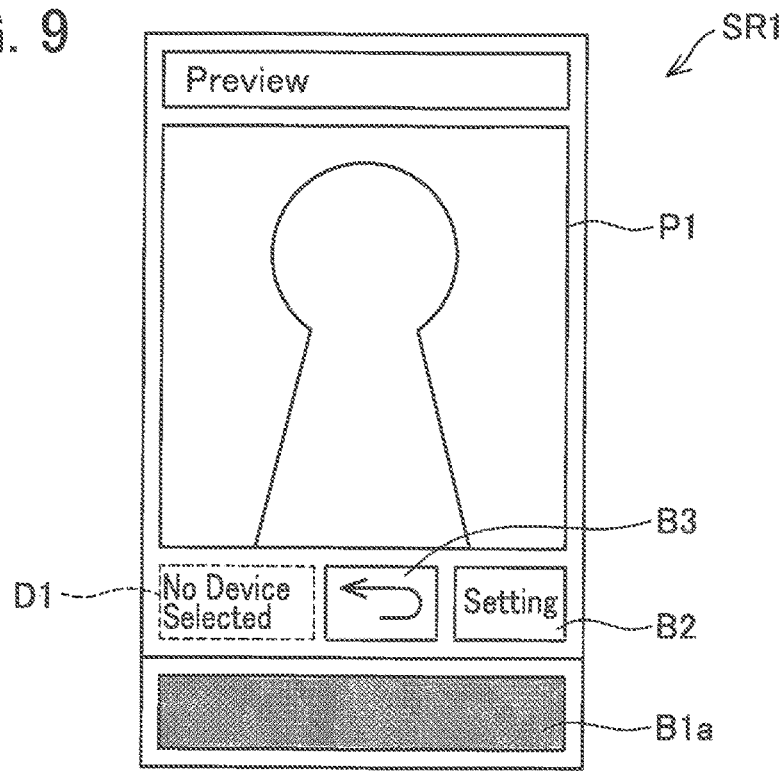
FIG. 9 shows an example of a first preview screen.

In S230, the CPU 106 displays the first preview screen. The first preview screen is a screen that is displayed when it is not possible to receive a processing execution instruction. FIG. 9 shows an example of the first preview screen SR1. The first preview screen SR1 includes a processing execution button B1a, and processing status information D1. The processing execution button B1a is a button for displaying that it is not possible to receive the input of a processing execution command. The processing execution button B1a may also be a button in which the processing execution button B1 shown in FIG. 10 is grayed out. The processing status information D1 may also be information indicating that connection to the default device is not possible (for example, character string of "No Device Selected"). The CPU 106 thereafter returns to S190.

Meanwhile, when a positive determination is obtained in S225 (S225: YES), the CPU 106 proceeds to S235. In S235, the CPU 106 selects the SSID for identifying the network of the switching destination. Specifically, the CPU 106 selects an SSID that is different from the second SSID acquired in S205 among the plurality of types of SSIDs stored in the table TB1. In S240, the CPU 106 switches the network of the connection destination of the information processing device 100 to the network identified by the SSID selected in S235. In S242, the CPU 106 activates the connection confirmation thread. An operation example of the connection confirmation thread will be described later. The CPU 106 thereafter proceeds to S485 of FIG. 6.

Figure 5:
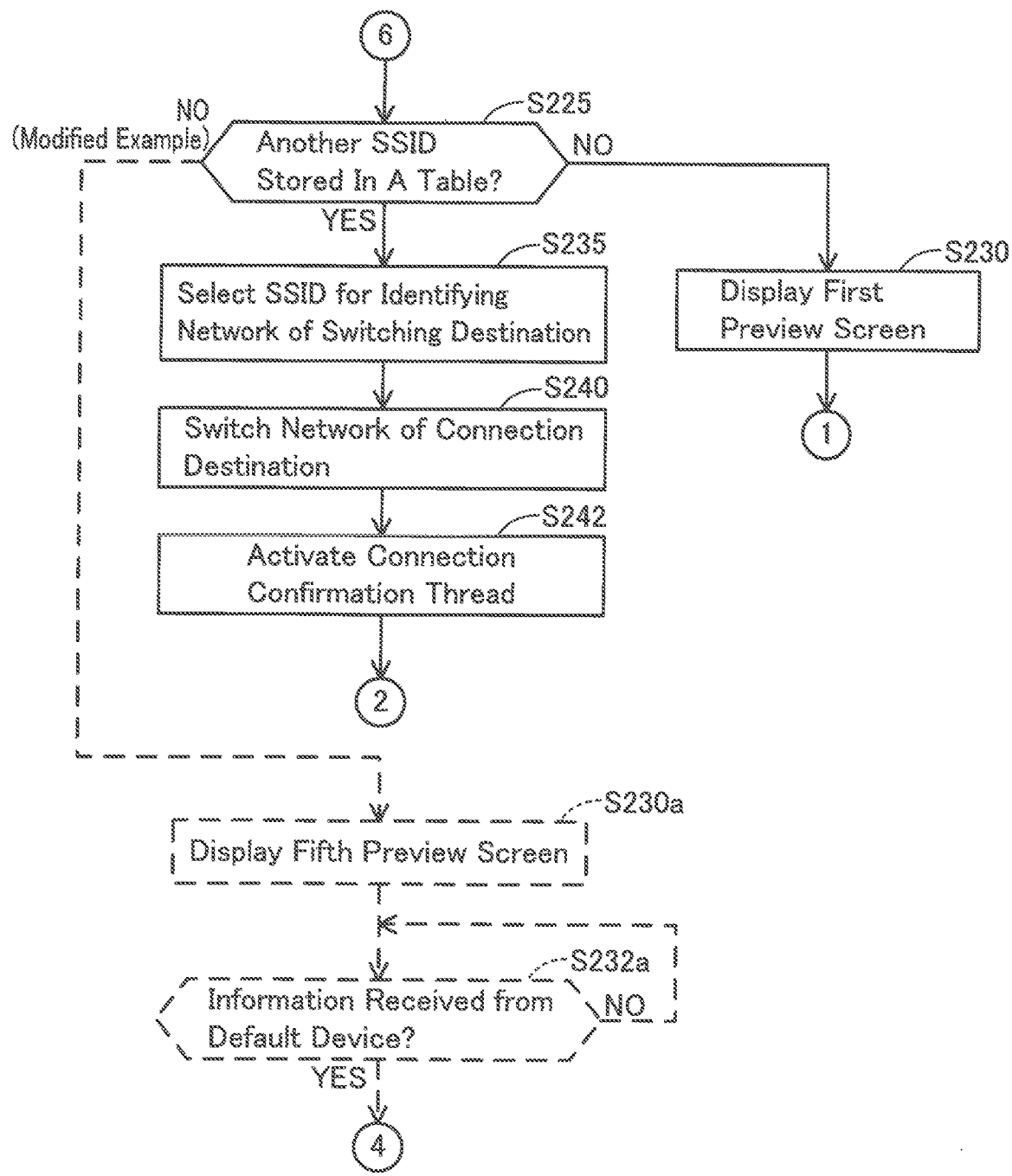
FIG. 5 is a flowchart for explaining an operation example of the main thread.
Figure 7:
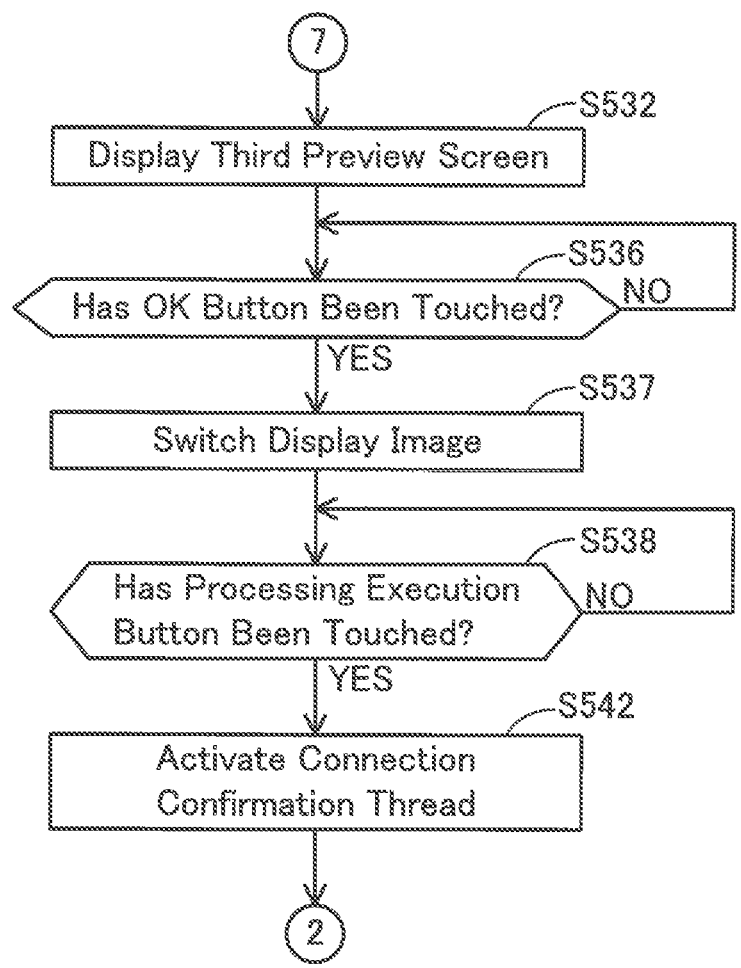
FIG. 7 is a flowchart for explaining an operation example of the main thread.
Figure 8:
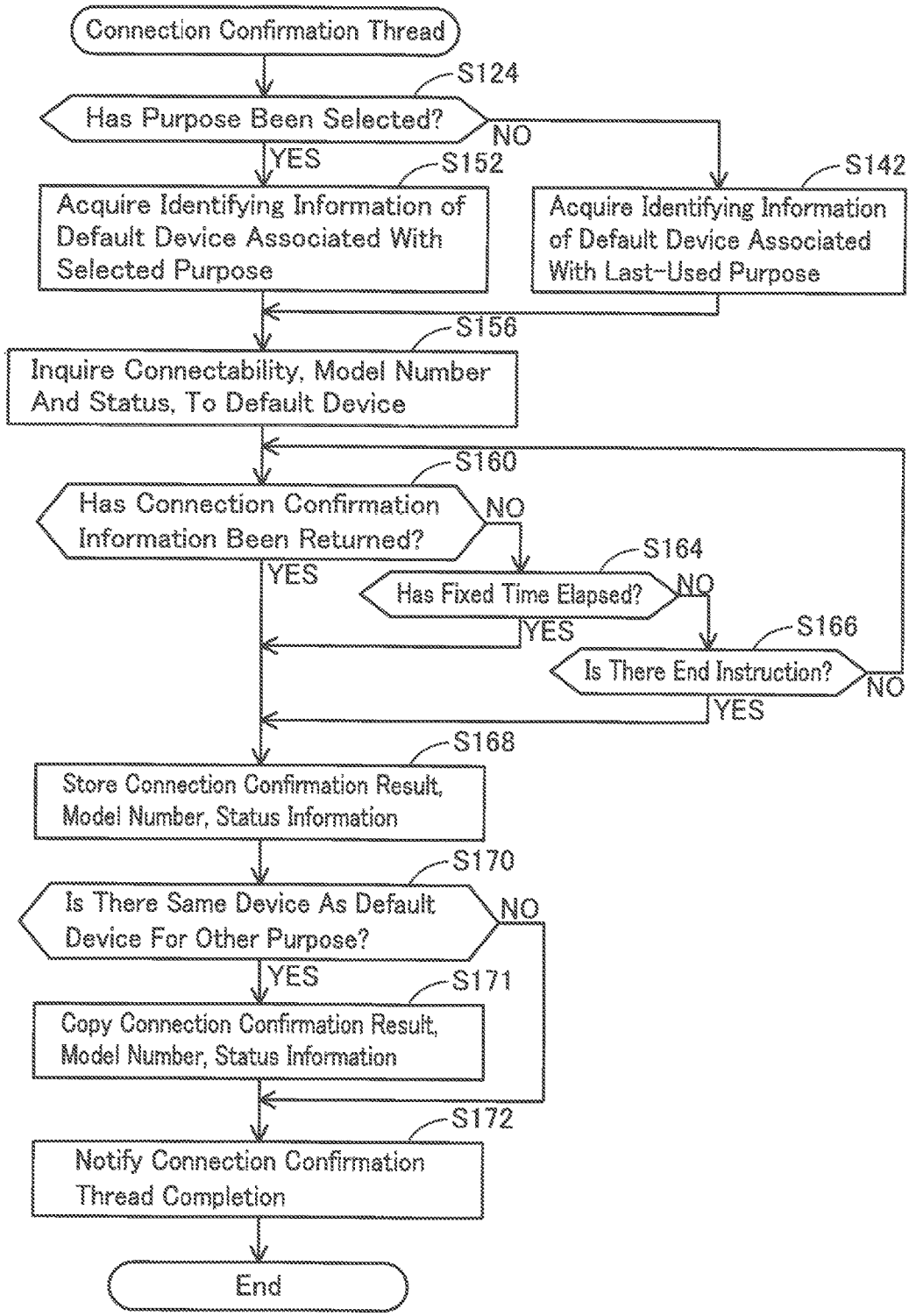
FIG. 8 is a flowchart for explaining an operation example of the connection confirmation thread.

In S485, the CPU 106 determines whether the connection confirmation thread started in S260 of FIG. 2, S208 of FIG. 2, S242 of FIG. 5, or S542 of FIG. 7 is complete. When a negative determination is obtained (S485: NO), the CPU 106 returns to S485, and when a positive determination is obtained (S485: YES), the CPU 106 proceeds to S510.

In S510, the CPU 106 determines the confirmation result of the connection confirmation thread. When a result to the effect that connection to the default device is possible (S510: OK), the CPU 106 proceeds to S550.

In S550, the CPU 106 determines whether the device status of the default device is a status capable of executing processing. This determination may also be made based on the information that is stored in the column of the status 608 of the table TB1 or the table TB2. For example, in a case that the print processing is to be executed by the default device, when information of "No ink" is stored in the column of the status 608 of the default device, it is determined that this is not a status capable of executing processing. In S550, when it is determined that this is a status in which processing cannot be executed (S550: NG), the CPU 106 proceeds to S555. In S555, the CPU 106 displays the first preview screen. Then, the CPU 106 returns to S190. Since the first preview screen has been explained with reference to FIG. 9, the explanation thereof is omitted.

Meanwhile, in S550, when it is determined that this is a status in which processing can be executed (S550: OK), the CPU 106 proceeds to S556. In S556, the CPU 106 determines whether the currently-selected purpose is scanning 613. When a negative determination is obtained (S556: NO), the CPU 106 proceeds to S560, and when a positive determination is obtained (S556: YES), the CPU 106 proceeds to S557. In S557, the CPU 106 sends a pre-scan execution instruction to the default device and acquires scanning preview image data from the default device.

In S560, the CPU 106 displays the second preview screen. When the selected purpose is scanning 613, the CPU 106 displays, in the main region A1, the preview image P1 based on the acquired scanning preview image data. Since the cases where the selected purpose is photo printing 611 or web printing 612 have been previously explained with reference to FIG. 10, the explanation thereof is omitted.

In S570, the CPU 106 determines whether the processing execution button B1 of the second preview screen SR2 has been touched. When a negative determination is obtained (S570: NO), the CPU 106 returns to S560, and when a positive determination is obtained (S570: YES), the CPU 106 proceeds to S575.

In S575, the CPU 106 executes print processing or scan processing. Print processing is executed when the content of the purpose selected in S190 is "photo printing 611" or "web printing 612". In print processing, the CPU 106 sends print data to the default device via the first wireless communication 151 or the second wireless communication 152. The default device executes print processing using the received print data. Scan processing is executed when the content of the purpose selected in S190 is "scanning 613". In scan processing, the CPU 106 sends a scan execution instruction to the default device via the first wireless communication 151 or the second wireless communication 152. The default device reads the set document and generates scan data, and sends the generated scan data to the information processing device 100. When the information processing device 100 receives the scan data sent from the default device, the CPU 106 may also store the scan data in a non-volatile area of the storage unit 109. Note that the CPU 106 may also send the scanning execution instruction to the default device in S557, and display, in the main region A1, the preview image P1 based on the returned scan data. In the foregoing case, it will suffice for the CPU 106 to store the scan data in the non-volatile area of the storage unit 109 in S575.

In S580, the CPU 106 stores, in the storage unit 109, the default device that was caused to execute the processing. Specifically, the table TB1 of FIG. 14 is selected when the communication with the default device was executed using the first wireless communication 151. Moreover, the table TB2 of FIG. 15 is selected when the communication with the default device was executed using the second wireless communication 152. In addition, the default device flag 605 of the device that executed the processing this time is set to "ON" in the column of the purpose for which the processing was executed this time among photo printing 611 to scanning 613, and the default device flag 605 of the other device is set to "OFF". It is thereby possible to store the device that executed the processing last as the default device. Moreover, the CPU 106 stores the executed purpose information in the storage unit 109. The executed purpose information may also be the name of the executed purpose. It is thereby possible to store the purpose for which the processing was executed last.

In S585, the CPU 106 stores the communication path that was used in the execution of the processing. Specifically, a communication path flag indicating whether the first wireless communication 151 or the second wireless communication 152 was used is stored in the storage unit 109. The CPU 106 thereafter ends the main thread.

Meanwhile, when it is determined that connection to the default device is impossible in S510 (S510: NG), it is determined that communication with that default device is not possible even though a default device of the selected purpose exists within the communication zone of the information processing device 100. The CPU 106 thereafter proceeds to S532 of FIG. 7.

Figure 11:
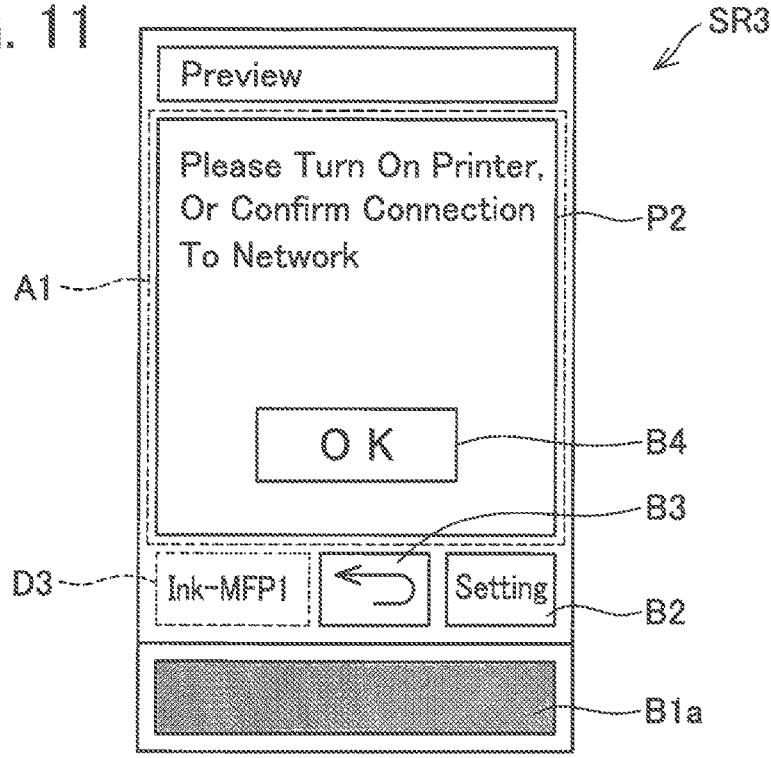
FIG. 11 shows an example of a third preview screen.

In S532, the CPU 106 displays the third preview screen. The third preview screen is a screen that is displayed when it is not possible to communicate with the default device existing within the communication zone of the information processing device 100. FIG. 11 shows an example of the third preview screen SR3. The third preview screen SR3 includes a notification image P2, an OK button B4, a default device information D3, and a processing execution button B1a. The notification image P2 is displayed in the main region A1. The notification image P2 may also be displayed in a size that is larger than the sub regions A2 and A3 so as to hide all or most of the preview image P1. The notification image P2 is an image for urging the user to set the default device in a communicable state. For example, the notification image P2 may include a message to the effect of "Please turn on the printer, or confirm connection of the network." The OK button B4 is an image for receiving the input indicating that the user executed the operation of setting the default device in a communicable state.

The default device information D3 is information (for example, model number) for identifying the default device as the device of the communication destination. The processing execution button B1a is a button that is displayed in a mode indicating that the input of a processing execution command cannot be received. The processing execution button B1a may also be a mode in which the processing execution button B1 is grayed out.

In S536, the CPU 106 determines whether the OK button B4 has been touched. When a negative determination is obtained (S536: NO), the CPU 106 returns to S536, and when a positive determination is obtained (S536: YES), the CPU 106 proceeds to S537. In S537, the CPU 106 switches the notification image P2 to the preview image P1. Moreover, the CPU 106 switches the processing execution button B1a to the processing execution button B1. Consequently, the display is switched from the third preview screen SR3 shown in FIG. 11 to the second preview screen SR2 shown in FIG. 10.

In S538, the CPU 106 determines whether the processing execution button B1 has been touched. When a negative determination is obtained (S538: NO), the CPU 106 returns to S538, and when a positive determination is obtained (S538: YES), the CPU 106 proceeds to S542. In S542, the CPU 106 actives the connection confirmation thread. An operation example of the connection confirmation thread will be described later. The CPU 106 thereafter returns to S485 of FIG. 6.

Figure 3:
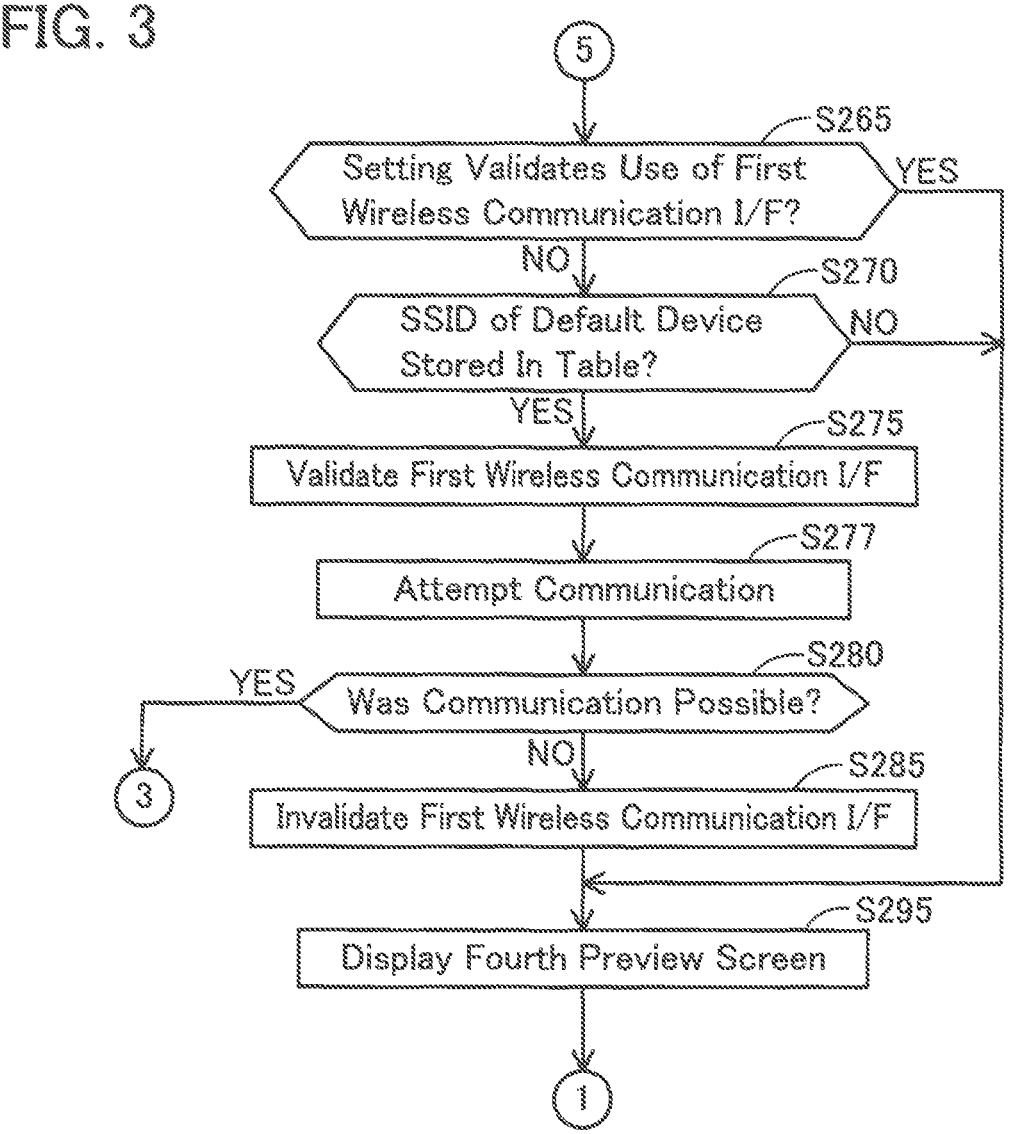
FIG. 3 is a flowchart for explaining an operation example of the main thread.

Moreover, in S204 of FIG. 2, when it is determined that the communication path using the first wireless communication 151 has not been actually established (S204: NO), the CPU 106 proceeds to S265 (FIG. 3). In S265, the CPU 106 determines whether the first wireless communication I/F 131 has been validated. When a positive determination is obtained (S265: YES), the CPU 106 proceeds to S295, and when a negative determination is obtained (S265: NO), the CPU 106 proceeds to S270. As an example of a negative determination being obtained in S265, considered may be a case where the first wireless communication I/F 131 is invalidated.

In S270, the CPU 106 determines whether the SSID for identifying the network to which the default device of the purpose selected in S190 belongs is stored in the table TB1. When a negative determination is obtained (S270: NO), the CPU 106 proceeds to S295, and when a positive determination is obtained (S270: YES), the CPU 106 proceeds to S275.

In S275, the CPU 106 validates the state of the first wireless communication I/F 131 via the operating system 124. In S277, the CPU 106 uses the first wireless communication I/F 131 and attempts communication via the first wireless communication 151.

In S280, the CPU 106 determines whether communication via the first wireless communication 151 was possible. This determination may also be made by causing the first wireless communication 151 to broadcast a packet for requesting the return of the identifying information (for example, model number) of the device, and determining whether the return of the identifying information was received. When a positive determination is obtained (S280: YES), the CPU 106 returns to S205, and when a negative determination is obtained (S280: NO), the CPU 106 proceeds to S285. In S285, the CPU 106 invalidates the state of the first wireless communication I/F 131 via the operating system 124.

Figure 12:
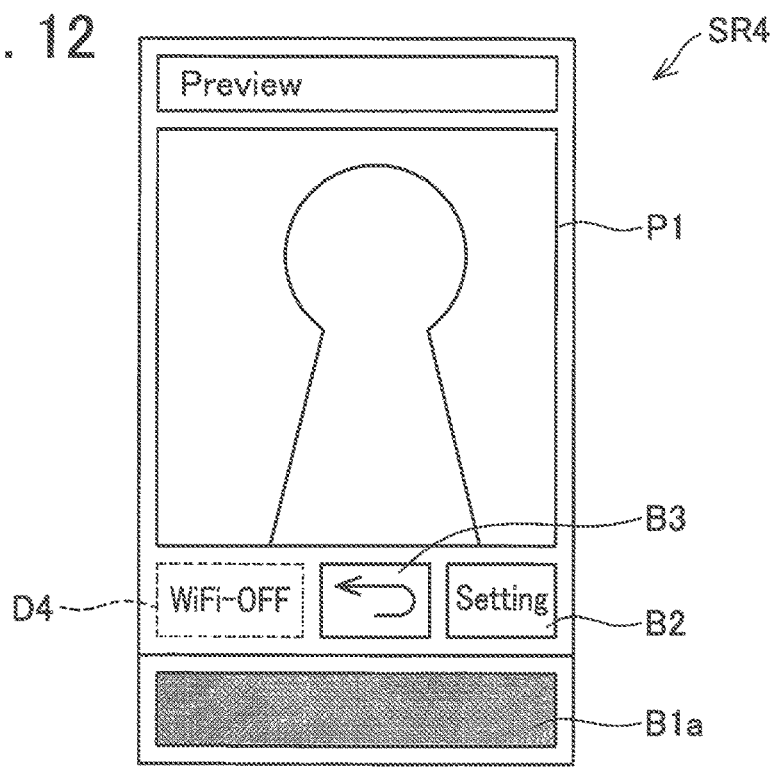
FIG. 12 shows an example of a fourth preview screen.

In S295, the CPU 106 displays the fourth preview screen. The fourth preview screen is a screen that is displayed when the first wireless communication I/F 131 is invalidated. FIG. 12 shows an example of the fourth preview screen SR4. The fourth preview screen SR4 includes communication status information D4. The communication status information D4 is an image indicating that the first wireless communication 151 using the first wireless communication I/F 131 cannot be performed. The communication status information D4 may include, for example, a character string of "WiFi-OFF". The CPU 106 thereafter returns to S190.

<Connection Confirmation Thread>

The processing contents of the connection confirmation thread are now explained with reference to the flow of FIG.

8. In S124, the CPU 106 determines whether the purpose to be executed has been selected among the three types of purposes of photo printing 611, web printing 612, and scanning 613. Specifically, the CPU 106 determines whether the result of the determination in S190 of FIG. 2 was a result indicating that the purpose had been selected by the user. When a positive determination is obtained (S124: YES), the CPU 106 proceeds to S152.

In S152, the CPU 106 acquires the identifying information of the default device associated with the selected purpose. For example, in a case that the first wireless communication 151 has been selected as the communication path, when the photo printing 611 is selected as the purpose, the CPU 106 refers to the storage area corresponding to photo printing 611 in the table TB1 of FIG. 14. Subsequently, the CPU 106 reads the identifying information 600 of the device in which the default device flag 605 is "ON". For example, in a case that the second wireless communication 152 has been selected as the communication path, when the scanning 613 is selected as the purpose, the CPU 106 refers to the storage area corresponding to scanning 613 in the table TB2 of FIG. 15. Subsequently, the CPU 106 reads the identifying information 700 of the device in which the default device flag 605 is "ON".

Meanwhile, when a negative determination is obtained in S124 (S124: NO), the CPU 106 proceeds to S142. In S142, the CPU 106 acquires the identifying information of the default device information associated with the purpose that was last used. Specifically, the CPU 106 reads the executed purpose information described later in S580, and specifies the purpose for which the processing thereof was last executed. Subsequently, the CPU 106 refers to the column of the purpose for which the processing thereof was last executed in the table TB1 or the table TB2, and reads the identifying information 600 of the device in which the default device flag 605 is "ON".

In S156, the CPU 106 executes the connection confirmation processing. The connection confirmation processing is processing of making an inquiry to the default device regarding connectability, model number, and status. Specifically, the CPU 106 uses the identifying information 600 or 700 acquired in S152 and attempts to communicate with the default device.

In S160, the CPU 106 determines whether the connection confirmation information was returned from the default device. The connection confirmation information is information which confirms that the communication connection is possible. When a positive determination is obtained in S160 (S160: YES), the CPU 106 proceeds to S168. In S168, the CPU 106 stores the "OK" information indicating that connection to the default device is possible in the connection confirmation result 606 of the table TB1 or the table TB2. Moreover, the CPU 106 stores the model number of the default device itself, which was received from the default device, in the column of the received model number 607. Moreover, the CPU 106 stores the status information received from the default device in the column of the status 608.

Meanwhile, when a negative determination is obtained in S160 (S160: NO), the CPU 106 proceeds to S164. In S164, the CPU 106 determines whether a predetermined fixed time has elapsed. When a positive determination is obtained (S164: YES), the CPU 106 proceeds to S168. In S168, the CPU 106 stores "NG" information indicating that connection to the default device is not possible in the connection confirmation result 606 of the table TB1 or the table TB2.

Meanwhile, when a negative determination is obtained in S164 (S164: NO), the CPU 106 proceeds to S166.

In S166, the CPU 106 determines whether an end instruction has been input by the user. The end instruction may be input, for example, by displaying a button image for accepting the end of the connection confirmation thread on the display unit 102, and touching the button. When a negative determination is obtained (S166: NO), the CPU 106 returns to S160. Meanwhile, when a positive determination is obtained (S166: YES), the CPU 106 proceeds to S168, and stores "NG" information indicating that connection to the default device is not possible in the connection confirmation result 606 of the table TB1 or the table TB2.

In S170, the CPU 106 determines whether a device that is the same as the default device is stored in a column of another purpose, other than the purpose for which the connection confirmation thread was executed, in the table TB1 or the table TB2. When a negative determination is obtained (S170: NO), the CPU 106 proceeds to S172, and when a positive determination is obtained (S170: YES), the CPU 106 proceeds to S171. In S171, the CPU 106 copies the "OK" information indicating that connection to the default device is possible, the received model number, and the status information to the connection confirmation result 606, the received model number 607, and the status 608 of the device of the other purpose.

In S172, the CPU 106 notifies the completion of the connection confirmation thread to the main thread. The CPU 106 thereby ends the connection confirmation thread.

<Effect>

According to the print & scan application 121 and the like described in the present specification, when there is no default device within the communication zone of the information processing device 100 (S210: NO), the first preview screen SR1 (refer to FIG. 9, processing status information D1) indicating that communication with the default device is not possible can be displayed on the display unit 102 (S230). Moreover, when there is a default device within the communication zone of the information processing device 100 (S210: YES), the second preview screen SR2 (refer to FIG. 10, default device information D2) indicating the default device can be displayed on the display unit 102 (S255). Consequently, the user can recognize whether a communication destination device within the communication zone of the information processing device 100.

According to the print & scan application 121 and the like described in the present specification, when there is no default device within the communication zone of the information processing device (S210: NO), the first preview screen SR1 (FIG. 9) indicating that communication with the default device is not possible can be displayed on the display unit 102 (S230). Meanwhile, when there is a default device within the communication zone of the information processing device (S210: YES), but actual communication with the default device is not possible (S510: NG), the third preview screen SR3 (refer to FIG. 11) for urging the user to set the default device in a communicable state can be displayed on the display unit 102 (S532). In other words, the contents to be displayed on the display unit 102 can be changed depending on whether the cause of not being able to communicate with the default device is because the default device exists outside the communication zone of the information processing device 100, or, while the default device exists within the communication zone of the information processing device 100, there is a problem with that default device (for example, the power is turned off). When there is a problem with the default device, the user can recognize that the communication is not possible due to a problem with the default device. In other words, when it is possible to easily enable communication with the default device (for example, when communication can be validated by turning on the power of the default device or the wireless communication switch), it is possible to notify the user that communication is possible if the default device is validated. It is thereby possible to execute the various types of processing (S538: YES) in accordance with the user switching to a communicable state with the default device such as by turning on the power of the default device (S536: YES).

According to the print & scan application 121 and the like described in the present specification, when it is discovered that communication with the default device is actually impossible (S510: NG), the processing execution button B1a (refer to FIG. 11) indicating that the input of a processing execution command cannot be received can be displayed on the display unit 102 (S532). When the OK button B4 for receiving the input which indicates that the default device has been set in a communicable state is touched after the processing execution button B1a is displayed (S536: YES), the processing execution button B1 (FIG. 10) indicating that the input of a processing execution command can be received may be displayed on the display unit 102 in substitute for the processing execution button B1a (S537). It is thereby possible to receive the communication execution instruction in accordance with the fact that communication with the default device is now possible. Consequently, it is possible to prevent a situation where unneeded processing of attempting communication is performed even though communication with the default device is not possible.

According to the print & scan application 121 and the like described in the present specification, when the first wireless communication I/F 131 is in an invalidated state (S285), the communication status information D4 (refer to FIG. 12) indicating that the first wireless communication 151 using the first wireless communication I/F 131 is not possible can be displayed on the display unit 102. It is thereby possible to notify the user that the first wireless communication I/F 131 is in an invalidated state.

According to the print & scan application 121 and the like described in the present specification, when the first wireless communication I/F 131 is in an invalidated state (S265: NO), the first wireless communication I/F 131 can be changed to be in a validated state (S275), and communication may be thereafter attempted (S277). Consequently, for example, even when the user attempted to perform communication in a state where the first wireless communication I/F 131 is still in an invalidated state, the user's convenience can be improved since the first wireless communication I/F 131 can be automatically set to be in a validated state. Moreover, as a result of attempting communication (S277), when it is discovered that communication via the first wireless communication 151 is not possible (S280: NO), the state of the first wireless communication I/F 131 can be returned to an invalidated state (S285). Since it is thereby possible to prevent a situation of unneeded standby operations being performed by the first wireless communication I/F 131, power consumption can be reduced.

According to the print & scan application 121 and the like described in the present specification, when another SSID that is different from the second SSID acquired in S205 is stored in the table TB1 (S225: YES), the network of the switching destination can be selected based on the other SSID (S235), and the information processing device 100 can be connected to the network of the switching destination (S240). Consequently, when a default device cannot be detected in the network to which the information processing device 100 is currently connected, it is possible to switch to a network to which the information processing device 100 was previously connected, and then search for the default device. It is thereby possible to increase the probability of being able to communicate with the default device.

According to the print & scan application 121 and the like described in the present specification, when a default device of a purpose other than the purpose selected in S190 belongs to the network to which the information processing device 100 is currently connected (S215: YES), the communication destination can be switched to the default device of another purpose (S220). It is thereby possible to use the default device of another purpose in substitute for the default device of the purpose selected in S190.

According to the print & scan application 121 and the like described in the present specification, it is possible to receive the input of the user's operation of selecting a purpose among photo printing 611, web printing 612, and scanning 613 (S190). Furthermore, when the default device of the purpose selected in S190 does not exist within the communication zone of the information processing device 100 (S210: NO), the first preview screen SR1 (refer to FIG. 9, processing status information D1) can be displayed (S230). Moreover, when the default device of the purpose selected in S190 exists within the communication zone of the information processing device 100 (S210: YES), the second preview screen SR2 can be displayed (S255). It is thereby possible to set a default device for each purpose.

According to the print & scan application 121 and the like described in the present specification, the user selects the purpose (S190), and, in accordance with the fact that the preview screen display command was input by the user (S195: YES), it is possible to determine whether the default device of the purpose selected in S190 exists within the communication zone of the information processing device 100 (S210). Consequently, since it is only necessary to determine whether the default device of the purpose selected by the user exists within the communication zone of the information processing device 100, the processing load can be reduced.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications will be described below.

Modified Example 1

When a negative determination is obtained in S225 (S225: NO), the CPU 106 may also proceed to S230a. In S230a, the CPU 106 may also display the fifth preview screen. FIG. 13 shows an example of the fifth preview screen SR5. The fifth preview screen SR5 includes communication status information D5, default device information D6, and a processing execution button B1a. The communication status information D5 is an image indicating that the default device exists outside the communication zone of the information processing device 100. The communication status information D5 may also include, for example, a character string to the effect of "No WiFi Service". The default device information D6 is information (for example, model number) for identifying the default device as the device of the communication destination. The processing execution button B1a is a button for displaying that the input of a processing execution command cannot be received.

In S232a, the CPU 106 may periodically confirm whether the various types of information sent from the default device were received by the first wireless communication I/F 131. Since the detailed contents of the processing have been explained in S205, the explanation thereof is omitted. When a negative determination is obtained (S232a: NO), the CPU 106 may return to S232a, and when a positive determination is obtained (S232a: YES), the CPU 106 may proceed to S556. It is thereby possible to display the second preview screen SR2 (refer to FIG. 10) (S560).

Consequently, the user can recognize that the default device exists outside the communication zone of the information processing device 100 by viewing the displayed communication status information D5 (S230a). Moreover, by monitoring whether the default device falls within the communication zone of the information processing device 100 (S232a), when it is determined that the default device now exists within the communication zone (S232a: YES), the second preview screen SR2 (refer to FIG. 10) can be automatically displayed (S560). It is thereby possible to receive the input of a print execution command or a scan execution command.

Modified Example 2

In S536, various methods may be adopted as the method for determining whether the default device has been set in a communicable state. For example, whether the first wireless communication I/F 131 received the various types of information sent from the default device may be periodically confirmed. Since the detailed contents of the processing have been explained in S205, the explanation thereof is omitted. Furthermore, the CPU 106 may proceed to S537 in accordance with the reception of the various types of information sent from the default device. Since it is no longer necessary for the user to touch the OK button B4, the operability of the information processing device 100 can be improved.

Modified Example 3

The confirmation processing of determining whether the default device exists within the communication zone of the information processing device 100 explained in S210 may be executed at any stage of the processing. For example, the confirmation processing may be started in accordance with the start of the activation processing of the print & scan application 121 in S180. In the foregoing case, since it is before the stage of selecting the purpose in S190, the confirmation processing may also be executed to the respective default devices of photo printing 611, web printing 612, and scanning 613.

Modified Example 4

Figure 4:
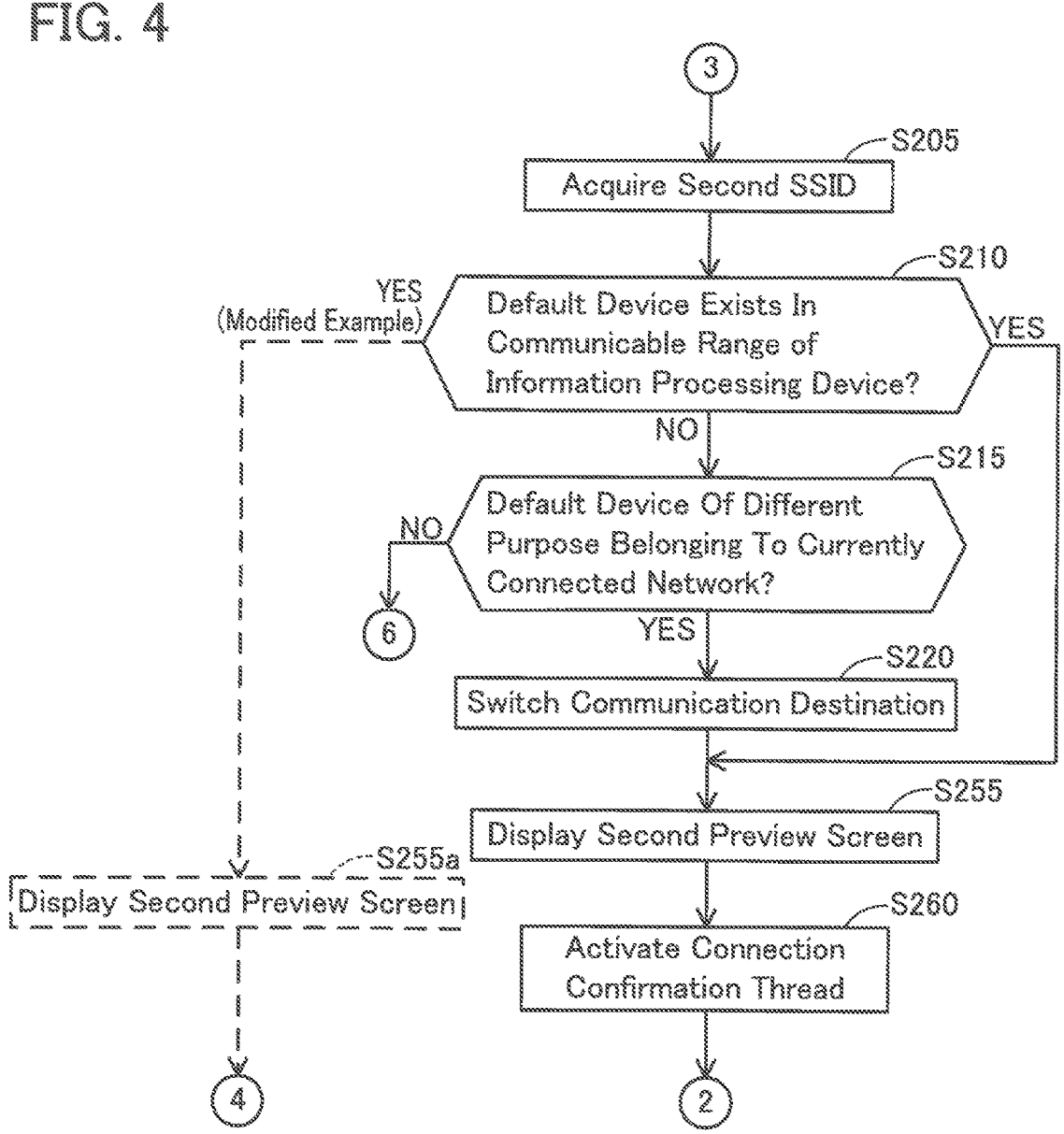
FIG. 4 is a flowchart for explaining an operation example of the main thread.

When a positive determination is obtained in S210 of FIG. 4 (S210: YES), the CPU 106 may also proceed to S255a. Since the contents of S255a are the same as S255 explained above, the explanation thereof is omitted. In addition, the CPU 106 may proceed to S556 of FIG. 6 after S255a. Consequently, when a positive determination is obtained in S210, it is possible to perform control so that the connection confirmation thread (S260) is not activated.

Other Modified Examples

In S235, various methods may be adopted as the method of selecting an SSID that is different from the second SSID among the plurality of types of SSIDs stored in the table TB1. For example, date/time information indicating the date and time that the plurality of types of SSIDs was stored in the table TB1 may be stored in the table TB1. In addition, the SSID stored in the table TB1 most recently may be selected in that order.

In S532, various modes may be adopted as the mode of displaying the notification image P2. For example, the notification image P2 may be temporarily displayed as a pop-up display using a toast pop-up or the like. After the pop-up display is ended, the second preview screen SR2 shown in FIG. 10 may be displayed.

The processing (S265 to S295) of automatically validating the first wireless communication I/F 131 may be omitted. The processing (FIG. 5, S225 to S242) of attempting communication using another SSID may be omitted. The processing (FIG. 7, S532 to S542) of displaying the third preview screen SR3 may be omitted. Accordingly, generally speaking, the information processing device 100 will suffice so as long as it at least comprises the "first storage control unit", "acquisition unit" and "first display control unit". As a specific example, the information processing device 100 needs to execute at least S580, S205, S230 or S255.

The method of acquiring the SSID of the access point in S205 may be of various modes. For example, adopted may be a configuration where the user manually inputs the SSID of the access point for enabling the information processing device 100 to communicate. Here, the CPU 106 recognizes the access point of the SSID manually input by the user as the communicable access point.

The devices connected to the information processing device 100 are not limited to the inkjet MFPs 201 to 203, the color laser printer 204, and the scanners 205 and 206 illustrated in FIG. 1. Any type of device may be connected so as long as the device comprises a printing function and a scanning function.

Communication between the access points 500 and 501 and the device may be wireless or wired.

The model number 601 may be of any mode so as long as the devices can be differentiated and, for example, may be configured only of symbols without containing numbers. Moreover, a name such as the device name capable of differentiating the devices may also be used in substitute for the model number.

The information processing device may also be configured to be connectable to an external memory such as an SD card. In addition, adopted may be a configuration of storing various types of data in an external memory in substitute for the storage unit 109.

While the information processing device 100 was explained as an example of the image processing apparatus, the configuration is not limited thereto. The configuration may also adopt a sewing machine that performs stitching or quilting of a predetermined image based on instruction data. The configuration may also adopt a sewing machine that performs decorative stitching or sewing to form work pieces or products based on image data. The configuration may also adopt a 3D printer that generates 3D images via spraying or machining based on instruction data or the like. The configuration may also adopt work piece manufacturing equipment or product manufacturing equipment that forms work pieces or products via spraying or machining based on image data or the like. As an example of image data, 3D image data or 3D CAD data may be used. The configuration may also adopt a scanner that forms image data based on output data from a sensor which optically or electrically detects the profile of an object or based on output data from a sensor that is mounted on the object. The configuration may also adopt a scanner creates data indicating the shape or movement of an object based on the output from a sensor. As an example of image data, moving image data or 3D image data may be used.

Each program may be constituted by a single program module or by a plurality of program modules. Each example may adopt another replaceable configuration which is within the context of the present invention. Adoptable configurations include a computer (the CPU 106 or the like) which executes processing based on a program (the print & scan application 121 or the like), a computer which executes processing based on a program other than an image processing program such as an operating system and other applications, a hardware configuration (the panel 103 or the like) which operates according to an instruction by a computer, and a configuration in which a computer and a hardware configuration work in conjunction with each other. Obviously, adoptable configurations also include a computer which executes processing by coupling processing based on a plurality of programs, and a hardware configuration which operates according to an instruction by a computer which executes processing by coupling processing based on a plurality of programs.

What is claimed is:

1. A non-transitory computer-readable storage medium storing computer-readable instructions for an information processing device configured to communicate with a communication destination device which is selected as a communication target among a plurality of devices, the information processing device comprising:
   a communication interface configured to communicate with the plurality of devices;
   a processor coupled to the communication interface; and
   a storage unit,
the instructions, when executed by the processor, causing the information processing device to perform:
   storing, in the storage unit, communication destination device identifying information for identifying a device that was selected as the communication destination device among the plurality of devices;
   storing, in the storage unit, first network identifying information for identifying a network to which the communication destination device belongs;
   storing, in the storage unit, one or more second network identifying information for identifying one or more networks to which the information processing device was previously connected, among a plurality of networks;
   receiving third network identifying information for identifying a network to which the information processing device is to connect;
   determining whether the received third network identifying information for identifying the network, to which the information processing device is to connect, matches the first network identifying information for identifying the network to which the communication destination device belongs;
   based on the determination that the third network identifying information does not match the first network identifying information, selecting one of the second network identifying information from among the one or more second network identifying information stored in the storage unit, and connecting to another network identified by the selected second network identifying information; and
   based on the determination that the third network identifying information matches the first network identifying information, displaying a communication-destination-device-indicating image indicating which of the plurality of devices is the communication destination device on the display.

2. The non-transitory computer-readable storage medium according to claim 1, wherein the instructions, when executed by the processor, cause the information processing device to further perform:
   displaying a communication-unperformable-state-indicating image different from the communication-destination-device-indicating image, and indicating that communication cannot be performed with the communication destination device on the display, in a case that a state of the information processing device is in an unreceived state, where information that the communication destination device, which is identified by the communication destination identifying information stored in the storage unit, had sent cannot be received despite the determination that the third network identifying information matches the first network identifying information.

3. The non-transitory computer-readable storage medium according to claim 2, wherein
   based on the determination that the third network identifying information matches the first network identifying information, the communication-destination-device-indicating image is displayed in a sub region of the display,
      the sub region being a region that is arranged to align with a main region, which is a region including a center of the display and for displaying a main image, and
      the sub region having a smaller size than the main region, and
   the communication-unperformable-state-indicating image is displayed in the main region of the display in the case where the state of the information processing device is in the unreceived state,
      the communication-unperformable-state-indicating image suggesting to set the communication destination device in a communicable state, and
      the communication-unperformable-state-indicating image being displayed in a size larger than the sub region.

4. The non-transitory computer-readable storage medium according to claim 3, wherein the instructions, when executed by the processor, cause the information processing device to further perform:
   displaying a first accepting image in a first accepting image region on the display in a first display mode, in the case where the state of the information processing device is in the unreceived state,
      the first accepting image being an image for accepting a first input that instructs to execute communication of communication information with the communication destination device via the communication interface,
      the first accepting image region being a region in the display that is different from the main region and the region, and the first display mode being a mode indicating that the first input cannot be accepted; and displaying a second accepting image in the main region of the display as the communication-unperformable-state-indicating image in the case where the state of the information processing device is in the unreceived state, the second accepting image being an image for accepting a second input that indicates that the communication destination device has been set in a communicable state, wherein the first accepting image is displayed in a second display mode that is different from the first display mode in a case where the second input is accepted via the second accepting image after the first accepting image was displayed in the first display mode, the second display mode indicating that the first input can be accepted.

5. The non-transitory computer-readable storage medium according to claim 1, wherein the instructions, when executed by the processor, cause the information processing device to further perform:

displaying an image indicating that communication using the communication interface cannot be executed on the display, in a case where a setting to invalidate the communication interface is being set.

6. The non-transitory computer-readable storage medium according to claim 1, wherein the instructions, when executed by the processor, cause the information processing device to further perform:

changing a setting of the communication interface so as to validate the communication interface, in a case where the setting to invalidate the communication interface is being set, wherein the third network identifying information is received via the communication interface when the setting to validate the communication interface is set.

7. The non-transitory computer-readable storage medium according to claim 6, wherein the instructions, when executed by the processor, cause the information processing device to further perform:

based on the determination that the third network identifying information does not match the first network identifying information, returning the setting of the communication interface to the setting invalidating the communication interface.

8. The non-transitory computer-readable storage medium according to claim 1, wherein the instructions, when executed by the processor, cause the information processing device to further perform confirming whether or not the communication interface has received confirmation information sent from the communication destination device via the other network, in a case that the selected second network identifying information being different from the received third network identifying information is stored in the storage unit.

9. The non-transitory computer-readable storage medium according to claim 1, wherein the storage unit stores the communication destination device identifying information for each of the plurality of devices in association with a plurality of purposes, and the instructions, when executed by the processor, cause the information processing device to further perform comparing the first network identifying information for identifying a network to which a specific communication destination device belongs with the received third network identifying information in a case that an operation unit provided in the information processing device has received a purpose designating operation to designate one purpose, the specific communication destination device being a device identified by the communication destination device identifying information associated with the one purpose as designated by the purpose designating operation.

10. The non-transitory computer-readable storage medium according to claim 9, wherein the instructions, when executed by the processor, cause the information processing device to further perform:

comparing the first network identifying information with the received third network identifying information, the first network identifying information being for identifying the network to which the communication destination device identified by the communication destination device identifying information associated with a purpose other than the one purpose belongs, in a case where the first network identifying information differs from the received third network identifying information, the first network identifying information being for identifying the network to which the communication destination device identified by the communication destination device identifying information associated with the one purpose as designated by the purpose designating operation belongs; and switching the communication target via the communication interface to the specific communication destination device, in a case that the first network identifying information and the received third network identifying information match.

11. The non-transitory computer-readable storage medium according to claim 1, wherein the instructions, when executed by the processor, cause the information processing device to further perform:

accepting a third input instructing to display a preview image on the display, the preview image indicating a process mode using communication information to be communicated with the communication destination device, wherein the receiving of the third network identifying information and the displaying of the communication-destination-device-indicating image are performed when the third input is inputted.

12. The non-transitory computer-readable storage medium according to claim 1, wherein the receiving of the third network identifying information and the displaying of the communication-destination-device-indicating image are performed when the instructions are activated by the information processing device.

13. An information processing device comprising:

a communication interface configured to communicate with a plurality of devices;

a controller coupled to the communication interface; and a storage unit, wherein the information processing device is configured to communicate with a communication destination device which is selected as a communication target among a plurality of devices, and the controller is configured to:

store, in the storage unit, communication destination device identifying information for identifying a device that was selected as the communication destination device among the plurality of devices;

store, in the storage unit, first network identifying information for identifying a network to which the communication destination device belongs;

store, in the storage unit, one or more second network identifying information for identifying one or more networks to which the information processing device was previously connected, among a plurality of networks;

receive third network identifying information for identifying a network to which the information processing device is to connect;

determine whether the received third network identifying information for identifying the network, to which the information processing device is to connect, matches the first network identifying information for identifying the network to which the communication destination device belongs;

based on the determination that the third network identifying information does not match the first network identifying information, select one of the second network identifying information from among the one or more second network identifying information stored in the storage unit, and connect to another network identified by the selected second network identifying information; and based on the determination that the third network identifying information matches the first network identifying information, display a communication-destination-device-indicating image indicating which of the plurality of devices is the communication destination device on a display.

14. A method for controlling an information processing device configured to communicate with a communication destination device which is selected as a communication target among a plurality of devices, the information processing device comprising:
a communication interface configured to communicate with the plurality of devices; and
a storage unit, the method comprising:

storing, in the storage unit, communication destination device identifying information for identifying a device that was selected as the communication destination device among the plurality of devices;

storing, in the storage unit, first network identifying information for identifying a network to which the communication destination device is belonging;

storing, in the storage unit, one or more second network identifying information for identifying one or more networks to which the information processing device was previously connected, among a plurality of networks;

receiving third network identifying information for identifying a network to which the information processing device is to connect;

determining whether the received third network identifying information for identifying the network, to which the information processing device is to connect, matches the first network identifying information for identifying the network to which the communication destination device belongs;

based on the determination that the third network identifying information does not match the first network identifying information, selecting one of the second network identifying information from among the one or more second network identifying information stored in the storage unit, and connecting to another network identified by the selected second network identifying information; and based on the determination that the third network identifying information matches the first network identifying information, displaying a communication-destination-device-indicating image indicating which of the plurality of devices is the communication destination device on the display.

* * * * *